US011604966B1

(12) United States Patent
Gonzalez et al.

(10) Patent No.: US 11,604,966 B1
(45) Date of Patent: Mar. 14, 2023

(54) GENERATIVE ADVERSARIAL NETWORK OPTIMIZATION

(71) Applicant: Cognizant Technology Solutions U.S. Corporation, College Station, TX (US)

(72) Inventors: Santiago Gonzalez, Denver, CO (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 273 days.

(21) Appl. No.: 17/023,010

(22) Filed: Sep. 16, 2020

Related U.S. Application Data

(60) Provisional application No. 62/902,464, filed on Sep. 19, 2019.

(51) Int. Cl.
    *G06N 3/04* (2006.01)
    *G06F 17/16* (2006.01)
    *G06F 16/901* (2019.01)
    *G06N 3/086* (2023.01)

(52) U.S. Cl.
    CPC ....... *G06N 3/0454* (2013.01); *G06F 16/9027* (2019.01); *G06F 17/16* (2013.01); *G06N 3/086* (2013.01)

(58) Field of Classification Search
    CPC .. G06N 3/0454; G06N 3/086; G06F 16/9027; G06F 17/16
    USPC .......................................................... 706/15
    See application file for complete search history.

(56) References Cited

U.S. PATENT DOCUMENTS

2020/0410157 A1* 12/2020 van de Kerkhof ... G06F 40/166

OTHER PUBLICATIONS

Ustun, et al., "Determination of optimal support vector regression parameters by genetic algorithms and simplex optimization", Analytica Chimica Acta 544 (2005) 292-305 (Year: 2005).*
Ian Goodfellow, et al., "Generative Adversarial Nets," Proceedings of the International Conference on Neural Information Processing Systems (NIPS 2014), pp. 2672-2680.
(Continued)

*Primary Examiner* — Tsu-Chang Lee
(74) *Attorney, Agent, or Firm* — Dawn-Marie Bey; Bey & Cotropia PLLC (57) ABSTRACT

A process for discovering optimal Generative Adversarial Networks (GAN) includes jointly optimizing the three functions of a GANs process including (i) a real component of a discriminator network's loss that is a function of D(x), wherein D(x) is the discriminator network's output for a real sample from an input dataset; (ii) a synthetic component of the discriminator network's loss that is a function of D(G(z)), wherein D(G(z)) is the discriminator network's output for a generator network's synthetic samples z from a latent distribution; and (iii) a generator network's loss which is a function of D(G(z)), with the discriminator network's total loss being the sum of components (i) and (ii). And separately optimizing each of the three functions in accordance with a process for evolving candidate loss functions having tree format by a genetic algorithm and optimizing selected candidate loss functions by optimizing set of coefficients of each of the one or more best candidate loss functions, wherein the set of coefficients is represented by a vector with dimensionality equal to the number of nodes in the best candidate loss function's tree.

21 Claims, 4 Drawing Sheets

(56) References Cited

OTHER PUBLICATIONS

Joseph Rocca, "Understanding Generative Adversarial Networks (GANs), Building, step by step, the reasoning that leads to GANs" [online], Jan. 7, 2019 [retrieved Sep. 14, 2020], Towards Data Science, 21 pp., Retrieved From the Internet: https://towardsdatascience.com/understanding-generative-adversarial-networks-gans-cd6e4651a29.

M. Arjovsky, et al., "Wasserstein generative adversarial networks," Proceedings of the 34th International Conference on Machine Learning, PMLR 70, pp. 214-223, Sydney, Australia, Aug. 6-11, 2017.

I. Gulrajani, et al., "Improved Training of Wasserstein GANs," Advances in Neural Information Processing Systems 30, pp. 5767-5777, Curran Associates, Inc., arXiv: 1704.00028v3, 2017.

X. Mao, et al., "On the Effectiveness of Least Squares Generative Adversarial Networks," IEEE transactions on pattern analysis and machine intelligence, arXiv: 1712.06391v2, 2018.

Alex Castrounis, Innoarchtech, "Python vs. R for AI, Machine Learning, and Data Science," published by O'Reilly Media, Copyright InnoArchiTech LLC 2020.

Alex Castrounis, Innoarchtech, "Production vs. Development AI and Machine Learning," published by O'Reilly Media, Copyright InnoArchiTech LLC 2020.

Alex Castrounis, Innoarchtech, "Advanced Analytics Packages, Frameworks, and Platforms," published by O'Reilly Media, Copyright InnoArchiTech LLC 2020.

Victor Costa, et al., "COEGAN: Evaluating the Coevolution Effect in Generative Adversarial Networks," arXiv: 1912.06180v1, Dec. 12, 2019, 9 pp.

Alec Radford, et al., "Unsupervised Representation Learning With Deep Convolutional Generative Adversarial Networks," arXiv: 1511.06434v2, Jan. 7, 2016, 16 pp.

* cited by examiner

GENERATIVE ADVERSARIAL NETWORK OPTIMIZATION

CROSS REFERENCE TO RELATED APPLICATIONS

This application claims benefit of priority to U.S. Provisional Application No. 62/902,464 entitled "Generative Adversarial Network Optimization" filed Sep. 19, 2019 which is incorporated herein by reference in its entirety.

This application cross-references and incorporates by reference herein in its entirety, U.S. patent application Ser. No. 16/878,843 entitled SYSTEM AND METHOD FOR LOSS FUNCTION METALEARNING FOR FASTER, MORE ACCURATE TRAINING, AND SMALLER DATASETS, which was filed on May 29, 2020. This application also cross-references and incorporates herein commonly owned U.S. patent application Ser. No. 15/794,905 entitled EVOLUTION OF DEEP NEURAL NETWORK STRUCTURES and U.S. patent application Ser. No. 16/212,830 entitled EVOLUTIONARY ARCHITECTURES FOR EVOLUTION OF DEEP NEURAL NETWORKS.

FIELD OF THE TECHNOLOGY

The present embodiments are generally directed to a process for discovering improved GAN network variations.

BACKGROUND

Generative Adversarial Networks (GANs) have emerged to be the top method for creating generative models, and conditioned generative models. By way of background, Generative modeling is an unsupervised learning task in machine learning that involves automatically discovering and learning the regularities or patterns in input data in such a way that the model can be used to generate or output new examples that plausibly could have been drawn from the original dataset. Said another way, generative models may generate synthetic data points in the input space.

In the GANs process, a generative model is trained by framing the problem as a supervised learning problem with two sub-models: a generator model that is trained to generate new examples, and a discriminator model that tries to classify examples as either real (from the domain) or fake (generated). The two models are trained together in a zero-sum game until the discriminator model incorrectly identifies generated examples as real some set percentage of time, e.g. 50%. In one of the very first documents describing GANs, Generative Adversarial Nets, the authors describe the adversarial net framework using an analogy, wherein the generative model can be thought of as analogous to a team of counterfeiters, trying to produce fake currency and use it without detection, while the discriminative model is analogous to the police, trying to detect the counterfeit currency. The document Generative Adversarial Nets by Goodfellow et al., published in Proceedings of the International Conference on Neural Information Processing Systems (NIPS 2014). pp. 2672-2680 (Goodfellow), is incorporated herein by reference in its entirety. For additional description and context related to understanding GANs the article Understanding Generative Adversarial Networks (GANs), Building, step by step, the reasoning that leads to GANs, Towards Data Science (Jan. 7, 2019) (on-line) is also incorporated herein by reference in its entirety and constitutes what was known to those skilled in the art at the time of filing.

The ability for a generative model to take input data and generate a realistic example has limitless applicability. For example, image-to-image translation and generation of photorealistic photos are examples of two applicable domains.

A key issue with GANs, however, has been their instability and difficulty training. Numerous variants of the basic GAN formulation have been created, attempting to solve these issues in different ways. For example, GAN (non-saturating), WGAN, LSGAN provide alternative or specialized variants. The Goodfellow paper incorporated herein by reference details the GAN (non-saturating) example. Versions of the Wasserstein-GAN (WGAN) are discussed in M. Arjovsky, et al., Wasserstein generative adversarial networks, Proceedings of the 34th International Conference on Machine Learning, volume 70 of Proceedings of Machine Learning Research, pages 214-223, International Convention Centre, Sydney, Australia, 6-11 Aug. 2017 and I. Gulrajani, et al., Improved training of Wasserstein GANs, Advances in Neural Information Processing Systems 30, pages 5767-5777, Curran Associates, Inc., 2017, both of which are incorporated herein by reference in their entireties. The Least squares generative adversarial network (LGAN) is described in X. Mao, et al., On the effectiveness of least squares generative adversarial networks, IEEE transactions on pattern analysis and machine intelligence, 2018.

While these new techniques have produced remarkable improvements over the original GAN, they are still plagued with instability and training issues that have prevented them from being in more widespread use. Some noted GAN challenges include: mode collapse, low variability datasets, artifacts and blurring, consensus with respect to probability distribution divergence, quantitative evaluation, etc. The existing GAN formulations can be boiled down to being new loss functions for GAN generator and discriminator networks, sometimes accompanied by vague structural guidelines for GAN generator and discriminator networks. Each new GANS formulation is hand-made, a laborious, manual process, requiring reasoning about the nature of training from a theoretical/statistical viewpoint, while making numerous assumptions which do not necessarily hold true in practice. The existing manual processes are inflexible.

Accordingly, there remains a need in the art for a process for the discovery of useable and improved GAN network variations. More particularly, the present embodiments aim to automate the present approaches to rediscover and leverage existing GANs formulations either as ends in themselves or as stepping stones to finding better solutions. Further, a need remains for flexibility such that any desired metric can be used to optimize GAN formulations with respect to that metric.

SUMMARY OF CERTAIN EMBODIMENTS

In a first exemplary embodiment, a process for discovering optimal Generative Adversarial Networks (GAN) formulations using Genetic Loss Optimization (GLO), includes: jointly optimizing the following functions using one or more programmed processors (i) a real component of a discriminator network's loss that is a function of $D(x)$, wherein $D(x)$ is the discriminator network's output for a real sample from an input dataset; (ii) a synthetic component of the discriminator network's loss that is a function of $D(G(z))$, wherein $D(G(z))$ is the discriminator network's output for a generator network's synthetic samples z from a latent distribution; and (iii) a generator network's loss which is a function of $D(G(z))$; wherein a discriminator network's total loss is the sum of components (i) and (ii). And further wherein, the one or more programmed processors separately optimize each of the functions (i), (ii), (iii) in accordance the following process: initiating by a genetic algorithm running on at least one processor a random population of candidate loss functions, wherein each candidate loss function includes a set of optimizable coefficients; a. training by the genetic algorithm the random population of candidate loss functions on training data; b. evaluating by the genetic algorithm a fitness of each candidate loss function based on a performance thereof on the training data in accordance with a fitness function; c. selecting by the genetic algorithm one or more select candidate loss functions in accordance with the fitness evaluations; d. reproducing by the genetic algorithm new candidate loss functions using the select candidate loss functions in accordance with reproduction processes to establish a next population of candidate loss functions; e. repeating steps a. to d. for $n^{th}$ generations; selecting by the genetic algorithm one or more best candidate loss functions in accordance with the fitness evaluations from an $n^{th}$ generation population of candidate functions; optimizing by an optimization process running on at least one processor the set of coefficients of each of the one or more best candidate loss functions; and implementing an optimized best candidate loss function to train one or more predictive models.

In a second exemplary embodiment, a process for discovering optimal Generative Adversarial Networks (GAN) formulations using Genetic Loss Optimization (GLO), includes: jointly optimizing the following functions using one or more programmed processors (i) a real component of a discriminator network's loss that is a function of D(x), wherein D(x) is the discriminator network's output for a real sample from an input dataset; (ii) a synthetic component of the discriminator network's loss that is a function of D(G(z)), wherein D(G(z)) is the discriminator network's output for a generator network's synthetic samples z from a latent distribution; and (iii) a generator network's loss which is a function of D(G(z)); wherein a discriminator network's total loss is the sum of components (i) and (ii). And further wherein, the one or more programmed processors separately optimize each of the functions (i), (ii), (iii) in accordance with the following process: evolving candidate loss functions by a genetic algorithm and selecting one or more best candidate loss functions in accordance with a fitness evaluation, wherein the candidate loss function is a tree having multiple nodes; optimizing by an optimization process running on at least one processor a set of coefficients of each of the one or more best candidate loss functions, wherein the set of coefficients is represented by a vector with dimensionality equal to the number of nodes in the best candidate loss function's tree; and implementing an optimized best candidate loss function to train one or more predictive models.

In a third exemplary embodiment, a computer-readable medium storing instructions that, when executed by a computer, perform a process for discovering optimal Generative Adversarial Networks (GAN) formulations using Genetic Loss Optimization (GLO), including: jointly optimizing the following functions using one or more programmed processors (i) a real component of a discriminator network's loss that is a function of D(x), wherein D(x) is the discriminator network's output for a real sample from an input dataset; (ii) a synthetic component of the discriminator network's loss that is a function of D(G(z)), wherein D(G(z)) is the discriminator network's output for a generator network's synthetic samples z from a latent distribution; and (iii) a generator network's loss which is a function of D(G(z)); wherein a discriminator network's total loss is the sum of components (i) and (ii). And further wherein, the one or more programmed processors separately optimize each of the functions (i), (ii), (iii) in accordance the following process: evolving candidate loss functions by a genetic algorithm and selecting one or more best candidate loss functions in accordance with a fitness evaluation, wherein the candidate loss function is a tree having multiple nodes; optimizing by an optimization process running on at least one processor a set of coefficients of each of the one or more best candidate loss functions, wherein the set of coefficients is represented by a vector with dimensionality equal to the number of nodes in the best candidate loss function's tree; and implementing an optimized best candidate loss function to train one or more predictive models.

BRIEF DESCRIPTION OF FIGURES

The following figures are intended to be considered in combination with the Detailed Description provided herein.

DETAILED DESCRIPTION

The symbols and accompanying descriptions in Table 1 may be considered when describing one or more embodiments.

TABLE 1

| Symbol | Description |
| --- | --- |
| $G(x, \theta_G)$ | Generator function |
| $D(z, \theta_D)$ | Discriminator function |
| $P_{data}$ | Probability distribution of original data |
| $P_z$ | Latent vector noise distribution |
| $P_g$ | Probability distribution of G(z) |
| x | Data, where $x \sim P_{data}$ |
| $\tilde{x}$ | Generated data |
| z | Latent vector, where $z \sim P_z$ |
| c | Condition vector |
| λ | Represents various types of weights/hyperparameters |

Within the scope of classification neural networks, the Genetic Loss Optimization (GLO) framework described in U.S. patent application Ser. No. 16/878,843 entitled SYSTEM AND METHOD FOR LOSS FUNCTION METALEARNING FOR FASTER, MORE ACCURATE TRAINING, AND SMALLER DATASETS which is incorporated herein by reference in its entirety, has enabled the discovery and optimization of novel loss functions for neural networks. However, GLO is a single network solution and thus cannot be directly applied to GANs, since GANs consists of two networks, i.e., generator and discriminator, thus, more than one loss function.

At a high level, GLO uses a genetic algorithm to construct candidate loss functions as trees. The process takes the best candidate loss functions from this set and optimizes the coefficients thereof using covariance-matrix adaptation evolutionary strategy (hereafter "CMA-ES"). Evolutionary computation (hereafter "EC") methods were chosen because EC is arguably the most versatile of the metalearning approaches. EC, being a type of population-based search method, allows for extensive exploration, which often results in creative, novel solutions as described in, for example, commonly owned U.S. patent application Ser. No. 15/794,905 entitled EVOLUTION OF DEEP NEURAL NETWORK STRUCTURES and U.S. patent application Ser. No. 16/212,830 entitled EVOLUTIONARY ARCHITECTURES FOR EVOLUTION OF DEEP NEURAL NETWORKS, the entire contents of which are incorporated herein by reference.

In the present embodiments, the GLO framework is extended to discover more optimal GAN formulations. Since GAN formulations all hinge upon the loss functions that are used by the generator and discriminator networks, the present embodiments optimize these loss functions jointly. Specifically, there are three functions that need to be jointly optimized:

(1) The component of the discriminator's loss that is a function of D (x), the discriminator's output for a real sample from the dataset, (2) The synthetic/fake component of the discriminator's loss that is a function of D(G(z)), the discriminator's output for the synthetic sample from the generator's dataset that samples z from the latent distribution, and (3) The generator's loss, a function of D(G(z)).

The discriminator's full loss is simply the sum of components (1) and (2).

Figure 1A:
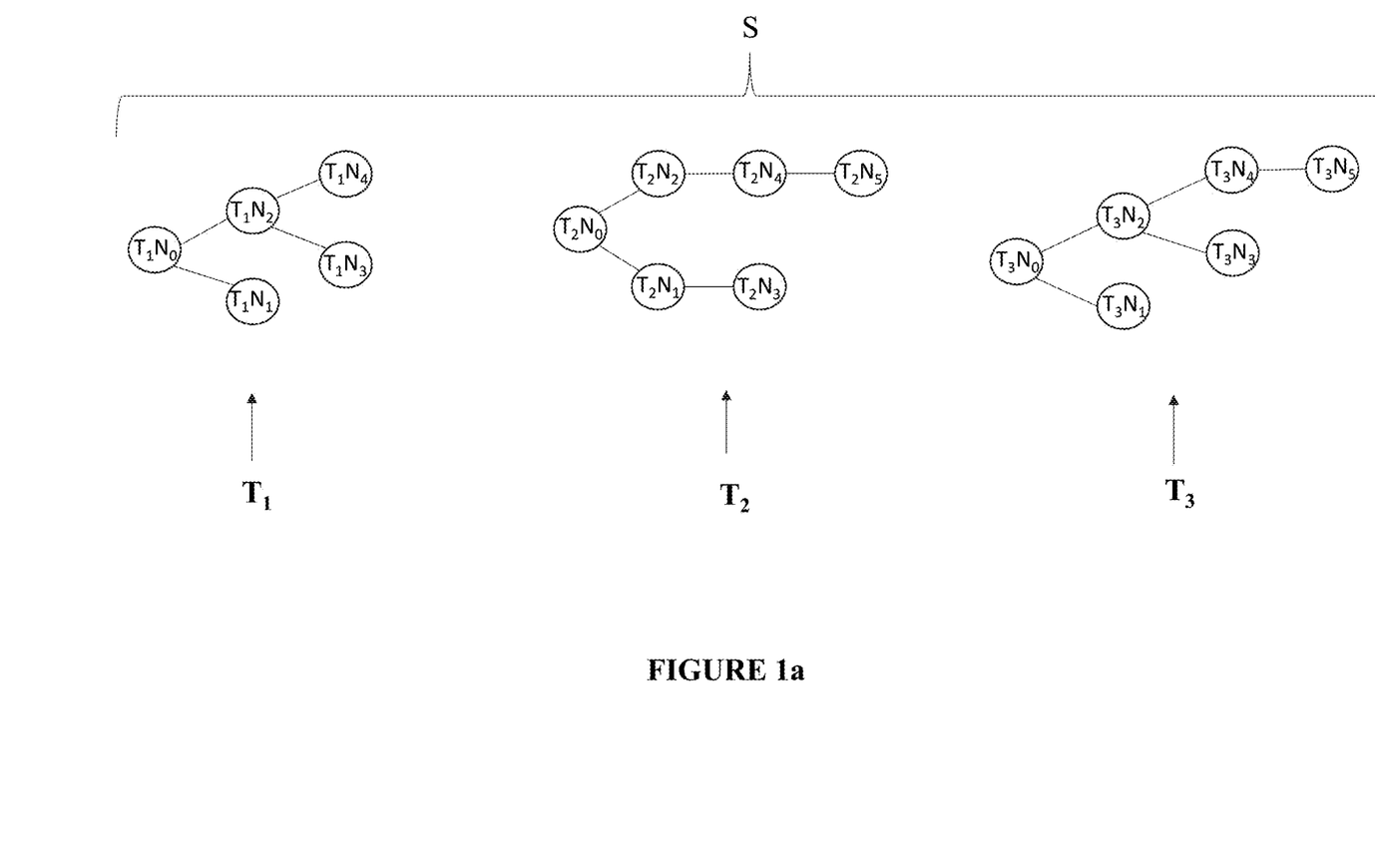
FIGS. 1a, 1b, 1c exemplify application of the GLO framework to loss function discovery of GAN network variations and optimization in accordance with an embodiment herein.

Referring to FIG. 1a, the GLO framework can be extended to have each organism (i.e., candidate) in the genetic algorithm be represented by a set (S) of three trees $T_1$, $T_2$ and $T_3$ (one for each function, i.e., $T_1=(1)$, $T_2=(2)$ and $T_3=(3)$ above), rather than a single tree. Each tree can have slight differences in its search space/genetic algorithm (GA) parameters. The loss function search space is defined by the following tree nodes:

Unary Operators: log( . . . ), . . . $^2$, $\sqrt{...}$
Binary Operators: +, x, −, +
Leaf Nodes: D(x), D(G(z))

One skilled in the art recognizes that the specific operators used in this example are only exemplary, more complex functions, such as the error function, can be included in the search space as well.

Figure 1B:
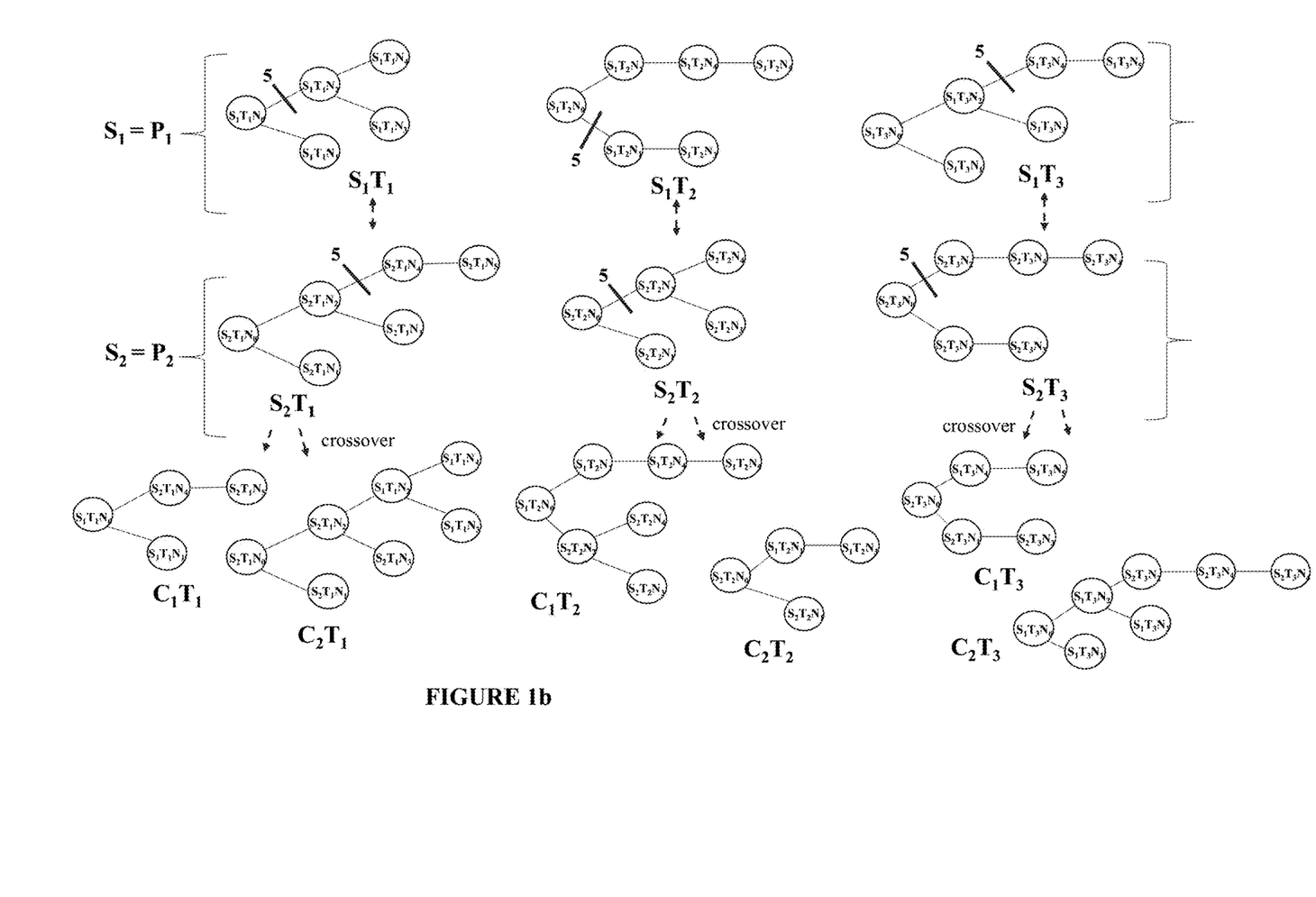

In the GLO framework loss function discovery Step 1, new organisms (candidates) are discovered using crossover wherein for a set of trees crossover is performed independently on each tree (this is essentially what happens in biological meiosis, where the chromosomes assume the role of trees) as exemplified in FIG. 1b. Recombination is accomplished by randomly splicing two trees together. For a given pair of parent trees, a random element is chosen in each as a crossover point. The two subtrees, whose roots are the two crossover points 5, are then swapped with each other. FIG. 1b presents an example of this method of recombination. Both resultant child trees become part of the next generation. In preliminary examples, recombination occurs with a probability of 80%. By way of example, in FIG. 1b, we assume Set 1 ($S_1$) is Parent 1 ($P_1$) and Set 2 ($S_2$) is Parent 2 ($P_2$). During crossover, the $T_1$ trees are crossed, the $T_2$ trees are crossed and the $T_3$ trees are crossed, resulting in two child (C) candidates from each individual tree crossover, i.e., $C_1T_1$ and $C_2T_1$, $C_1T_2$ and $C_2T_2$, $C_1T_3$ and $C_2T_3$. Next, the candidates are assembled to include one child from each individual crossover. In our example, there are 8 new candidates (i.e., new Sets of three trees) which may be formed from the combinations of children trees generated in Step 1.

Figure 1C:
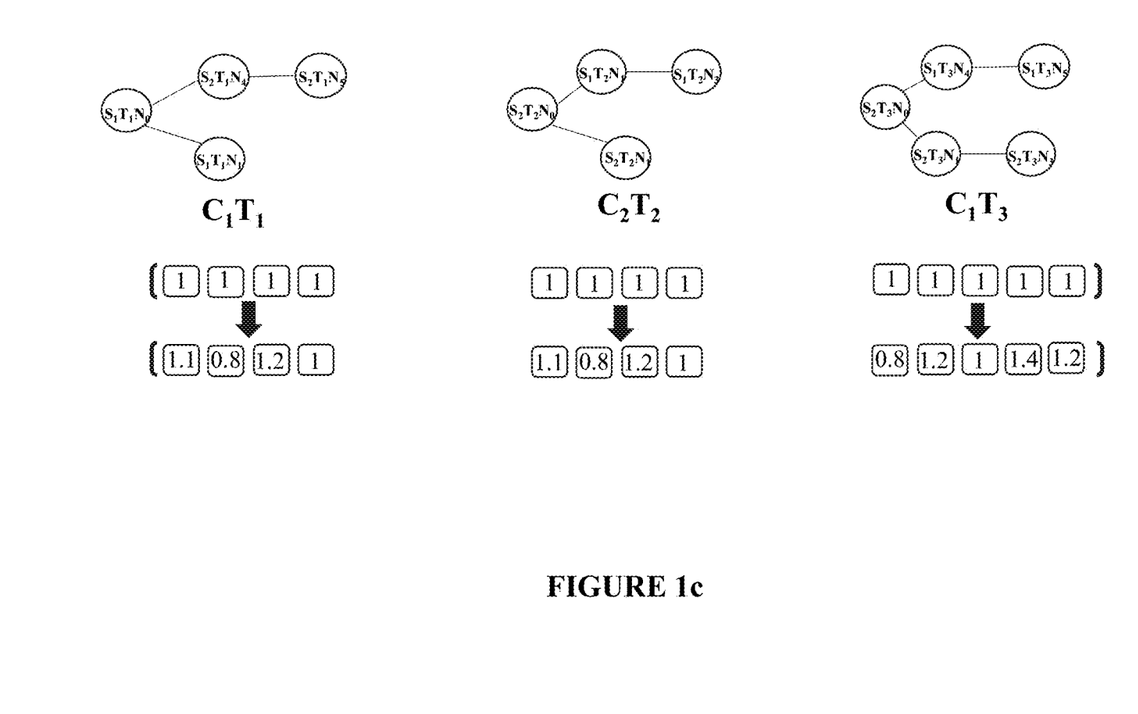

Next, in the coefficient optimization Step 2, the coefficient vectors from the three trees are concatenated to form the vector to be optimized. Take, for example, the new candidate set S3 which includes trees $C_1T_1$, $C_2T_2$, and $C_1T_3$. FIG. 1c shows the exemplary concatenation. Additionally, different conditions for each tree can short-circuit fitness evaluation for cases where a candidate Set of trees is known to not function.

Fitness for each set of three functions requires a different interpretation. Since GANs cannot be thought of as having an accuracy, a different fitness metric needs to be used. The choice of fitness metric (criteria) depends highly on the type of problem and target application. Exemplary metrics for the basic cases might include: MultiScale Structural Similarity Index Measure (MS-SSIM); Fréchet Inception Distance and Inception Score. In the uncommon case where the training data's sampling distribution is known, the clear choice would be to use the divergence between such a distribution and the distribution of samples from the generator. One skilled in the art recognizes that for more sophisticated applications where we have known, desired outputs, many difference metrics can be used, such as, for example, L1 or L2 distance between images.

Figure 2:
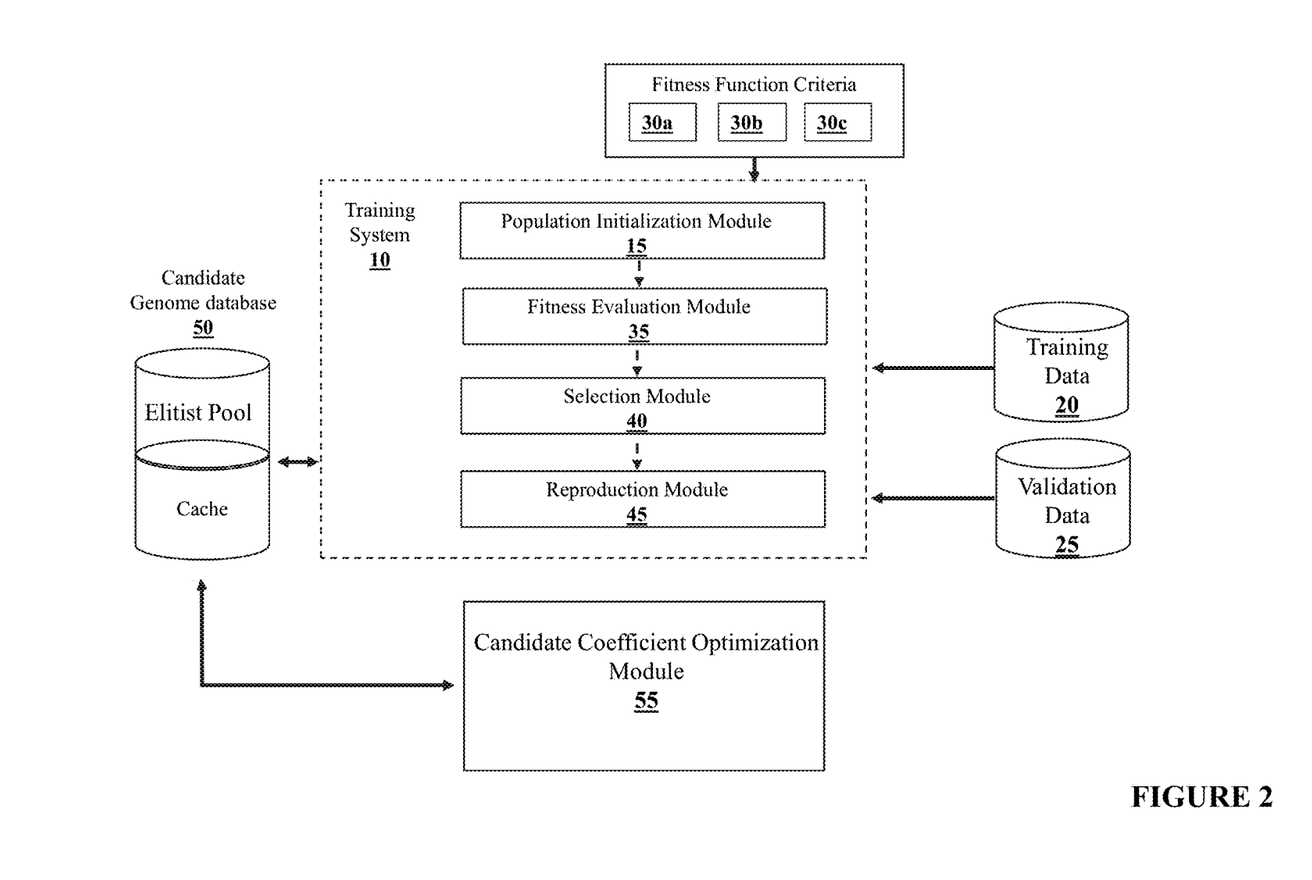
FIG. 2 exemplifies a system for application of the GLO framework to loss function discovery of GAN network variations and optimization in accordance with an embodiment herein.

Referring to FIG. 2, a candidate loss function discovery training system 10 includes a population initialization module 15 which generates an initial population of candidate loss function Sets composed of the three randomly generated trees. By way of example only, initial trees are of random trees of maximum depth 2. The following exemplary code may be used to generate initial trees:

```
/// Returns a random, recursively built tree subject to certain constraints.
    public static func random(onlyNonLeaf: Bool = false, depth: Int = 1, parent:
LivingTreeGene? = nil, template:
TreeGeneTemplate<GeneType>) -> LivingTreeGene {
        let randomType = onlyNonLeaf ? template.nonLeafTypes.randomElement( )! :
    template.allTypes.randomElement( )!
        let gene = LivingTreeGene(template, geneType: randomType, parent: parent,
    children: [ ])
        if randomType.isBinaryType {
            if depth == 1 {
                gene.children = [
                    LivingTreeGene(template, geneType:
template.leafTypes.randomElement( )!, parent: gene,children: [ ]),
                    LivingTreeGene(template, geneType:
template.leafTypes.randomElement( )!, parent: gene, children: [ ])
                ]
            } else {
                gene.children = [
                    random(onlyNonLeaf: onlyNonLeaf, depth: depth − 1, parent:
```

```
    gene, template: template),
              random(onlyNonLeaf: onlyNonLeaf, depth: depth - 1, parent:
    gene, template: template)
          ]
        }
    } else if randomType.isUnaryType {
    gene.children = [LivingTreeGene(template, geneType:
    template.leafTypes.randomElement( )!, parent: gene,
    children: [ ])]
    } else if randomType.isLeafType {
        // nop
    } else {
        fatalError( )
    }
    return gene
}
```

The initial randomly generated population of candidates is trained on training data from database 20, validated on validated data from database 25 and subjected to fitness evaluation by fitness evaluation module 35 applying individual fitness function criteria 30a, 30b, 30c for each of the three trees and in accordance with problem and/or target application. Using fitness function determinations, a selection module 40 identifies elite candidates, i.e., possible parents, and applies roulette sampling to select candidates for reproduction. The genetic algorithm used in the embodiments herein will have a population size commensurate with certain considerations, including the evolution problem, and incorporates elitism. One skilled in the art recognizes that population size and elites per generation may vary in accordance with resources, time, and problem. Elite candidates, as well as cached candidates, are stored in the candidate genome database 50. The selected candidates are provided to the reproduction module 45 for recombination (crossover) and mutation as discussed in the example above and shown in FIGS. 1a-1c.

Table 2 shows GLO's unified loss function interpretations of certain existing GAN formulations:

TABLE 2

| Formulation | Loss D (real) | Loss D (fake) | Loss G (fake) |
|---|---|---|---|
| GAN | $E_{x-Pdata}$ $-\log D(x)$ | $E_{z-Pz}$ $-\log(1 - D(G(z)))$ | $E_{z-Pz}$ $\log(1 - D(G(z)))$ |
| GAN (non-saturating) | $-\log D(x)$ | $-\log(1 - D(G(z)))$ | $-\log D(G(z))$ |
| WGAN | $-1)^2 D(x)$ | $D(G(z))$ | $-D(G(z))$ |
| LSGAN | $\frac{1}{2}(D(x) - 1)^2$ | $\frac{1}{2}(D(G(2)))2$ | $\frac{1}{2}(D(G(z)) - 1)^2$ |

It is known in the art that different types of GAN formulations work best with different activation functions, often even requiring differing activation functions in the generator and discriminator networks. To avoid falling into a space of GAN formulations that only function best under a prior assumption, the present embodiment may be extended to perform activation function selection in the evolution process. Searching different activation functions that make certain GAN formulations work better synergistically is a distinct point of novelty. Similarly, the present embodiments facilitate evolution of learning rate schedules for GANs for changing generator and discriminator learning rates throughout the training process.

In a specific implementation, activation function selections are represented by two additional, single-node trees (one each for the generator and discriminator). These trees each contain a single leaf, representing a possible activation function, such as ReLU. During evolution, structural changes to these trees are prohibited. That is, mutations can only change the type of the node. One skilled in the art recognizes that in more complex embodiments, these single-node trees can be promoted to full trees to allow for the evolution of complex activation functions in conjunction to the loss functions.

As discussed above GLO can be extended to discover new GAN formulations that can provide more stable training via the maximization of a desirable problem-specific metric. The invention functions by performing evolution jointly on three separate trees, one each for each functional component of a GAN formulation. Additionally, two single nodes are also jointly evolved to select appropriate activation functions for the generator and discriminator networks.

The embodiments allow for new formulations to be discovered which have better properties than existing ones. These novel formulations also avoid incorporating biases and assumptions that are typical of hand-designed formulations.

Additional embodiments involve the incorporation of existing regularization techniques into the formulation representations. For example, gradient penalties that encourage Lipschitz smoothness constraints have been found to improve many GAN formulations. Automatically determining whether a formulation needs such a gradient penalty, and how much, are an example of this extension.

It is submitted that one skilled in the art would understand the various computing environments, including computer readable mediums, which may be used to implement the methods described herein. Selection of computing environment and individual components may be determined in accordance with memory requirements, processing requirements, security requirements and the like. It is submitted that one or more steps or combinations of step of the methods described herein may be developed locally or remotely, i.e., on a remote physical computer or virtual machine (VM). Virtual machines may be hosted on cloud-based IaaS platforms such as Amazon Web Services (AWS) and Google Cloud Platform (GCP), which are configurable in accordance memory, processing, and data storage requirements. One skilled in the art further recognizes that physical and/or virtual machines may be servers, either stand-alone or distributed. Distributed environments many include coordination software such as Spark, Hadoop, and the like. For additional description of exemplary programming languages, development software and platforms and computing environments which may be considered to implement one or more of the features, components and methods described herein, the following articles are referenced and incorporated herein by reference in their entirety: Python vs R for Artificial Intelligence, Machine Learning, and Data Science; Production vs Development Artificial Intelligence and Machine Learning; Advanced Analytics Packages, Frameworks, and Platforms by Scenario or Task by Alex Castrounis of Innoarchitech, published online by O'Reilly Media, Copyright InnoArchiTech LLC 2020.

The invention claimed is:

1. A process for discovering optimal Generative Adversarial Networks (GAN) formulations using Genetic Loss Optimization (GLO), comprising:
jointly optimizing the following functions using one or more programmed processors
  (i) a real component of a discriminator network's loss that is a function of $D(x)$, wherein $D(x)$ is the discriminator network's output for a real sample from an input dataset;
  (ii) a synthetic component of the discriminator network's loss that is a function of $D(G(z))$, wherein $D(G(z))$ is the discriminator network's output for a generator network's synthetic samples z from a latent distribution; and
  (iii) a generator network's loss which is a function of $D(G(z))$;
wherein a discriminator network's total loss is the sum of components (i) and (ii);
  further wherein, the one or more programmed processors separately optimize each of the functions (i), (ii), (iii) in accordance the following process:
  initiating by a genetic algorithm running on at least one processor a random population of candidate loss functions, wherein each candidate loss function includes a set of optimizable coefficients;
    a. training by the genetic algorithm the random population of candidate loss functions on training data;
    b. evaluating by the genetic algorithm a fitness of each candidate loss function based on a performance thereof on the training data in accordance with a fitness function;
    c. selecting by the genetic algorithm one or more select candidate loss functions in accordance with the fitness evaluations;
    d. reproducing by the genetic algorithm new candidate loss functions using the select candidate loss functions in accordance with reproduction processes to establish a next population of candidate loss functions;
    e. repeating steps a. to d. for $n^{th}$ generations;
  selecting by the genetic algorithm one or more best candidate loss functions in accordance with the fitness evaluations from an $n^{th}$ generation population of candidate functions;
  optimizing by an optimization process running on at least one processor the set of coefficients of each of the one or more best candidate loss functions; and
  implementing an optimized best candidate loss function to train one or more predictive models.

2. The process according to claim 1, wherein the candidate loss functions are trees having one or more nodes.

3. The process according to claim 1, wherein the reproduction processes include recombination and mutation.

4. The process according to claim 2, wherein the set of coefficients is represented by a vector with dimensionality equal to the number of nodes in the best candidate loss function's tree.

5. The process according to claim 4, wherein the optimization process is a covariance-matrix adaptation evolutionary strategy (CMA-ES).

6. The process according to claim 5, wherein the CMA-ES is a variant $(\mu/\mu, \lambda)$-CMA-ES, which incorporates weighted rank-$\mu$ updates.

7. The process according to claim 1, further comprising optimizing a discriminator network activation function and a generator network activation function.

8. The process according to claim 7, wherein each of the discriminator and generator activation functions are represented as separate trees during the process, each tree having a single leaf.

9. The process according to claim 8, wherein the genetic algorithm mutates leaf type, but not tree structure.

10. A process for discovering optimal Generative Adversarial Networks (GAN) formulations using Genetic Loss Optimization (GLO), comprising:
jointly optimizing the following functions using one or more programmed processors
  (i) a real component of a discriminator network's loss that is a function of $D(x)$, wherein $D(x)$ is the discriminator network's output for a real sample from an input dataset;
  (ii) a synthetic component of the discriminator network's loss that is a function of $D(G(z))$, wherein $D(G(z))$ is the discriminator network's output for a generator network's synthetic samples z from a latent distribution; and
  (iii) a generator network's loss which is a function of $D(G(z))$;
wherein a discriminator's total loss is the sum of components (i) and (ii);
  further wherein, the one or more programmed processors separately optimize each of the functions (i), (ii), (iii) in accordance the following process:
  evolving candidate loss functions by a genetic algorithm and selecting one or more best candidate loss functions in accordance with a fitness evaluation, wherein the candidate loss function is a tree having multiple nodes;
  optimizing by an optimization process running on at least one processor a set of coefficients of each of the one or more best candidate loss functions, wherein the set of coefficients is represented by a vector with dimensionality equal to the number of nodes in the best candidate loss function's tree; and
  implementing an optimized best candidate loss function to train one or more predictive models.

11. The process according to claim 10, wherein the optimization process is a covariance-matrix adaptation evolutionary strategy (CMA-ES).

12. The process according to claim 11, wherein the CMA-ES is a variant $(\mu/\mu, \lambda)$-CMA-ES, which incorporates weighted rank-$\mu$ updates.

13. The process according to claim 10, further comprising optimizing a discriminator network activation function and a generator network activation function.

14. The process according to claim 13, wherein each of the discriminator and generator activation functions are represented as separate trees during the process, each tree having a single leaf.

15. The process according to claim 14, wherein the genetic algorithm mutates leaf type, but not a tree structure.

16. A non-transitory computer-readable medium storing instructions that, when executed by a computer, perform a process for discovering optimal Generative Adversarial Networks (GAN) formulations using Genetic Loss Optimization (GLO), comprising:
jointly optimizing the following functions using one or more programmed processors
(i) a real component of a discriminator network's loss that is a function of D(x), wherein D(x) is the discriminator network's output for a real sample from an input dataset;
(ii) a synthetic component of the discriminator network's loss that is a function of D(G(z)), wherein D(G(z)) is the discriminator network's output for a generator network's synthetic samples z from a latent distribution; and
(iii) a generator network's loss which is a function of D(G(z));
wherein a discriminator network's total loss is the sum of components (i) and (ii);
further wherein, the one or more programmed processors separately optimize each of the functions (i), (ii), (iii) in accordance the following process:
evolving candidate loss functions by a genetic algorithm and selecting one or more best candidate loss functions in accordance with a fitness evaluation, wherein the candidate loss function is a tree having multiple nodes;
optimizing by an optimization process running on at least one processor a set of coefficients of each of the one or more best candidate loss functions, wherein the set of coefficients is represented by a vector with dimensionality equal to the number of nodes in the best candidate loss function's tree; and
implementing an optimized best candidate loss function to train one or more predictive models.

17. A non-transitory computer readable medium according to claim 16, wherein the optimization process is a covariance-matrix adaptation evolutionary strategy (CMA-ES).

18. A non-transitory computer readable medium according to claim 17, wherein the CMA-ES is a variant (μ/μ, λ)-CMA-ES, which incorporates weighted rank-μ updates.

19. A non-transitory computer readable medium according to claim 16, further comprising stored instructions for optimizing a discriminator network activation function and a generator network activation function.

20. A non-transitory computer readable medium according to claim 19, wherein each of the discriminator and generator activation functions are represented as separate trees during the process, each tree having a single leaf.

21. A non-transitory computer readable medium according to claim 20, wherein the genetic algorithm mutates leaf type, but not a tree structure.

* * * * *